United States Patent
Benz et al.

[11] Patent Number: 5,656,209
[45] Date of Patent: Aug. 12, 1997

[54] PROCESS FOR MANUFACTURE OF FRESNEL LENSES

[75] Inventors: Volker Benz, Hochst; Martin Berkenkopf, Pfungstadt; Udo Fischer; Hans Lorenz, both of Darmstadt; Michael Meier-Kaiser, Pfungstadt, all of Germany

[73] Assignee: Roehm GmbH Chemische Fabrik, Darmstadt, Germany

[21] Appl. No.: 363,839

[22] Filed: Dec. 27, 1994

[30] Foreign Application Priority Data

Dec. 24, 1993 [DE] Germany ............... 43 44 392.3
Dec. 24, 1993 [DE] Germany ............... 9319928 U
Mar. 5, 1994 [DE] Germany ............... 44 07 468.9

[51] Int. Cl.$^6$ ............................................. B29D 11/00
[52] U.S. Cl. ................. 264/1.6; 264/1.7; 264/1.9; 264/284; 264/210.2; 264/173.16
[58] Field of Search ................... 264/1.6, 1.7, 1.9, 264/175, 173.16, 284, 210.1, 210.2

[56] References Cited

U.S. PATENT DOCUMENTS

| | | | |
|---|---|---|---|
| 3,810,804 | 5/1974 | Rowland | 264/1.9 |
| 4,149,817 | 4/1979 | Miller et al. | 264/1.7 |
| 4,921,669 | 5/1990 | Vetter et al. | 264/1.6 |
| 5,183,597 | 2/1993 | Lu | 264/1.7 |

FOREIGN PATENT DOCUMENTS

| | | | |
|---|---|---|---|
| 3505055 | 8/1986 | Germany | 264/1.6 |
| 56-95640 | 8/1981 | Japan | 264/1.9 |
| WO93/13929 | 7/1993 | WIPO | 264/1.6 |

*Primary Examiner*—Mathieu D. Vargot
*Attorney, Agent, or Firm*—Oblon, Spivak, McClelland, Maier & Neustadt, P.C.

[57] ABSTRACT

A process for the extrusion of plastic plates with very finely structured surface using an extrusion system which is equipped with an extruder and a three roll polishing stack containing a roller with the structuring surface. The system is designed for coextrusion and the plastic plates are produced via two extruders as a coextrudate CX from a highly viscous basic molding compound BF and a low viscosity molding compound NF which is extruded on BF. The surface of said plates is structured via the three roll polishing stack. Fresnel lenses produced by the process may be used in solar collectors.

7 Claims, 5 Drawing Sheets

PROCESS FOR MANUFACTURE OF FRESNEL LENSES

BACKGROUND OF THE INVENTION

1. Field of the Invention

The invention relates to a process for the manufacture of plastic plates with very finely structured surface, in particular a process for the manufacture of linear Fresnel lenses and solar collectors containing said Fresnel lenses.

2. Background of the Related Art

From various points of view, technology has developed methods for structuring plastic surfaces, provided the plastic is suitable to this end. For example, in the case of thermoplastics the surface is structured preferably by means of an embossing tool acting on the surface which is in a corresponding temperature state. (Becker-Braun, Polymer Handbook, vol. 1, Hauser Verlag, 1990, pp. 543–544; K. Stockhert, Finishing of Plastic Surfaces, Hauser 1975.) There exists commercially PMMA-based plastic plate material with characteristically structured surfaces. Said surfaces are manufactured, for example through extrusion with simultaneous embossing in a three roll polishing stack (calender). At the same time, one roller (embossing roller) is provided with the negative of the desired plate structure. The goal with structured plates is to obtain an optimally accurate reproduction of the detail of the roller structure. This goal is reached by setting the melt viscosity as low as possible and by setting the roller temperature as high as possible. Furthermore, as known from everyday practice, the pressure maximum upstream of the narrowest point in the nip (i.e. the gap between the polishing and the structured roller) should be high in order to be able to transfer as much embossing force as possible. The results of the three aforementioned conditions are unavoidable compromises in the technical implementation of the extrusion of structured plates.

The manufacture of plastic plates with structured surfaces according to the aforementioned state of the art has reached its limits, especially where especially high demands are imposed on fineness and accuracy of the structure. For example, the possibility of adapting the described boundary conditions is limited. The roller temperature cannot be arbitrarily increased, since most of the polymer melts adhere to hot metals. This tendency to stick results in separating problems at the embossing roller, starting at a certain roller temperature. Moreover, the melt viscosity of the plastic cannot be selected arbitrarily low, for example, by setting high melt temperatures, since otherwise the embossing force in the nip is too low.

The accurate reproduction of the detail of plates that are produced according to this process and with these limitations is—as stated above—not good enough for certain applications, i.e., fine structures are not correctly shaped or they are rounded off. However, such finely shaped surface structures represent a necessary prerequisite for interesting engineering applications.

In many fields of application in engineering optics it is often important to focus the light emitted from a light source. To this end, suitably dimensioned optical lenses are generally used. To produce a parallel pencil of rays, the light source should be in the focal point of the lens. The shorter the distance between light source and lens, the more light is collected. The result in everyday practice is a lens that exhibits a short focal distance and correspondingly a greater thickness.

From A. Fresnel stems the knowledge that there is also a lens effect when concentrically annular "steps" with comparable surface curvature are substituted for the closed convex surface of the lens. Fresnel lenses are thus so-called step lenses. They can be thought of as a normal lens that has been divided into segments and the surface of each segment has undergone a parallel shift (cf. FIG. 3).

Through the application of this principle, it is possible to build a lens with a high refractive power (short focal distance) and small thickness. Fresnel lenses can also be built as circular and as linear (cylinder) lenses. Known engineering applications for Fresnel lenses are, e.g., for projection screens, overhead projectors, filters for stage spot lights, wide angle view lenses for rear windows of motor vehicles such as delivery trucks or mobile homes, lenses for beacons, and the like.

SUMMARY OF THE INVENTION

Therefore, an object of the invention is to provide a process for the manufacture of plates with structured surface, which process meets the aforementioned requirements such as accurate reproduction of the detail of the embossing roller when the surface has a very fine structure.

In the process according to the invention, the aforementioned boundary conditions—high roller temperature, low melt viscosity and high embossing force in the nip—are put into practice accordingly.

The invention relates to a process for the extrusion of plastic plates which exhibit a finely structured surface, by means of an extrusion system which is equipped with two extruders and one three roll polishing stack containing a roller with a structured surface (embossing roller), and whose extruders are designed for coextrusion. Plate material is produced as a coextrudate CX from a highly viscous basic molding compound BF and a low viscosity molding compound NF extruded thereon, preferably with well-known parting agents TM.

The surface of said plate material is structured via the three roll polishing stack. (FIGS. 1 and 2 depict a suitable extrusion system). In so doing, the layer of coextrudate formed from the molding compound NF should not exceed the maximum depth of the roller structure. In general, the melt flow index (melt flow index =MFR, in accordance with DIN 57 735 or ASTM 1238-70) is cited as a characteristic for the melt-viscosity ratio. The necessary embossing force is guaranteed through the use oft he highly viscous molding compound BF as the substrate.

Suitable thermoplastics are polyacrylates, in particular PMMA, polycarbonate, polyolefins, LDPE, HDPE, PP, polyethyleneterephthalate, PVC, polystyrene, polyamide. The low viscosity molding compound NF can consist advantageously of types of polymer, such as the basic molding compound BF, but they can also comprise a plastic that is adequately compatible with said BF. (Cf. J. E. Johnson, Plastic Consultant, Vol. 10, PP. 538–541 (1976)). The general rule is that the melt viscosity of the coextrusion material NF should correspond to an injection molding compound for highly accurate reproduction of detail. The ratio of the melt viscosity indices MFR for the molding compounds BF and NF is approx. 1:10. It is mandatory, as stated above, that the thickness of the coextrusion layer, formed from the molding compound NF, does not exceed, as a rule, the maximum depth of the roller structure. The result is, in the first approximation, the relations of the layer thicknesses comprising BF and NF. Thus, the structure roller is reproduced in detail only in the coextruded layer. The parting agents TM, added in an advantageous manner with the molding compound NF, also belong to the state of the art (cf. H. F.

Mark et al., Encyclopedia of Polymer Science & Engineering, Index volume, pp. 307–324, J. Wiley 1990; Ullmann's Encyclopedia of Industrial Chemistry, 5th edition, vol. A20, pp. 479–483, VCH 1992; R. Gaechter, H. Müller, Plastic Additives, 3rd ed., Carl Hanser Verlag, 1989). Preferably the content of the parting agent TM, which is added with the molding compound NF, ranges from 0 to 0.34% by wt., based on the molding compound NF. Examples are, in particular, higher alcohols.

The tendency of the melt to adhere to hot metal decreases with the use of a parting agent in the molding compound NF. Therefore, the temperature of the structure roller can be significantly increased during the embossing process. Up to 70° C. above the glass transition temperature Tg of the molding compound NF can be named as a reference point. The glass transition temperatures Tg are known or can be calculated or found. (Cf. Brandrup-Immergut, Polymer Handbook, chapter V, J. Wiley, Vieweg-Esser, Polymer Handbook, vol. IX, pp. 333–340, Carl Hanser, 1975).

The extrusion technology which is suitable for the manufacture of coextrudates CX, which are synthesized from the basic molding compound BF and the low viscosity molding compound NF and are preferably provided with parting agents TM as plates is well-known (cf. J. E. Johnson, Plastic Consultant, vol. 10, pp. 538–5412 (1976), H. F. Mark et al, Encyclopedia of Polymer Science and Engineering, vol. 6, pp. 608–613, J. Wiley 186; Ullmann's Encyclopedia of Industrial Chemistry, vol. A20, pp. 479–483, VCH 1992; H. Batzer, Polymeric Materials, vol. II, pp. 134–137, 142, Georg Thieme 1984, vol. III, pp. 244–251, Georg Thieme 1984; EP 210 138).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
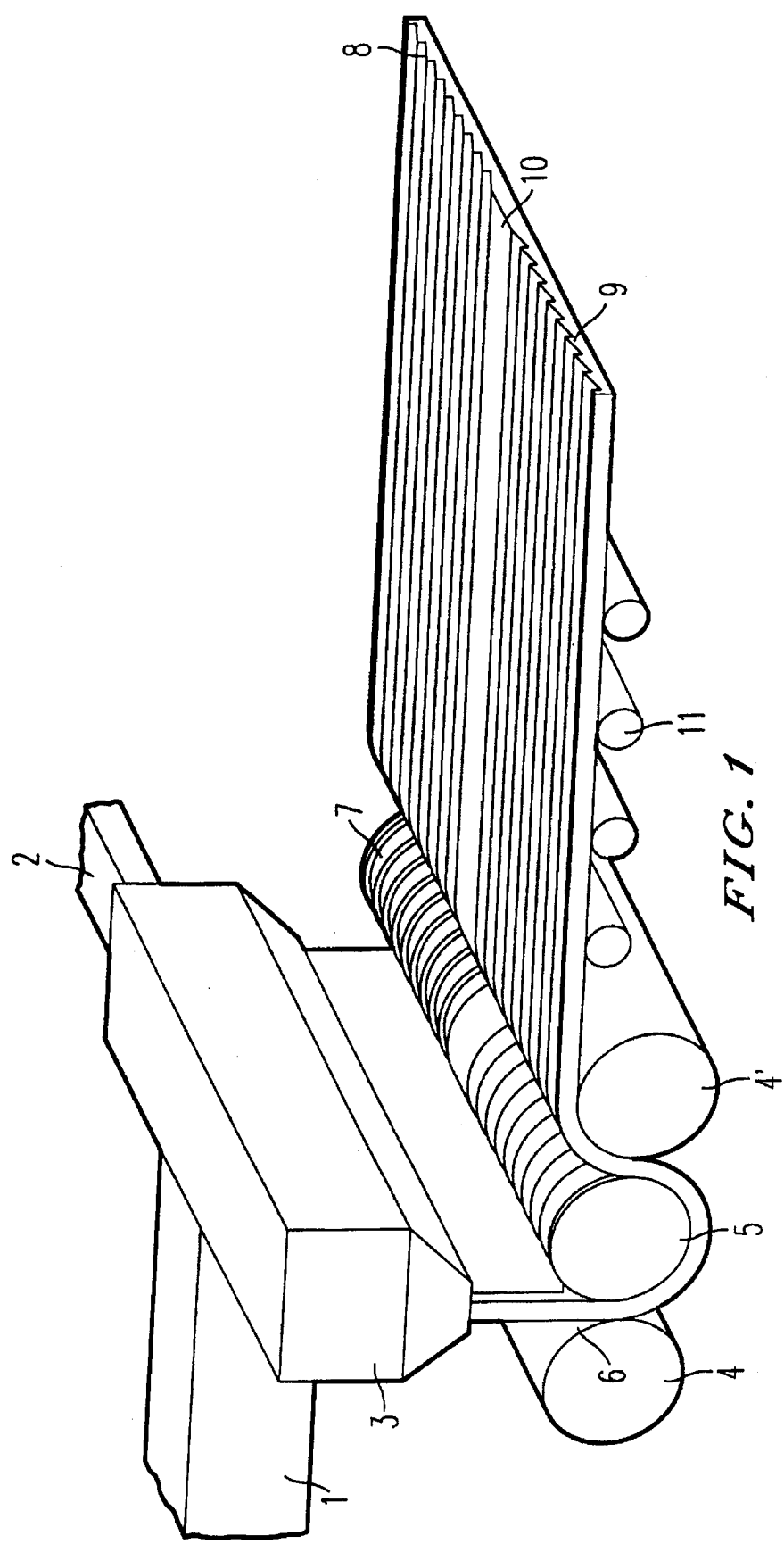
FIG. 1 is an overall view of the extrusion system.
Figure 2:
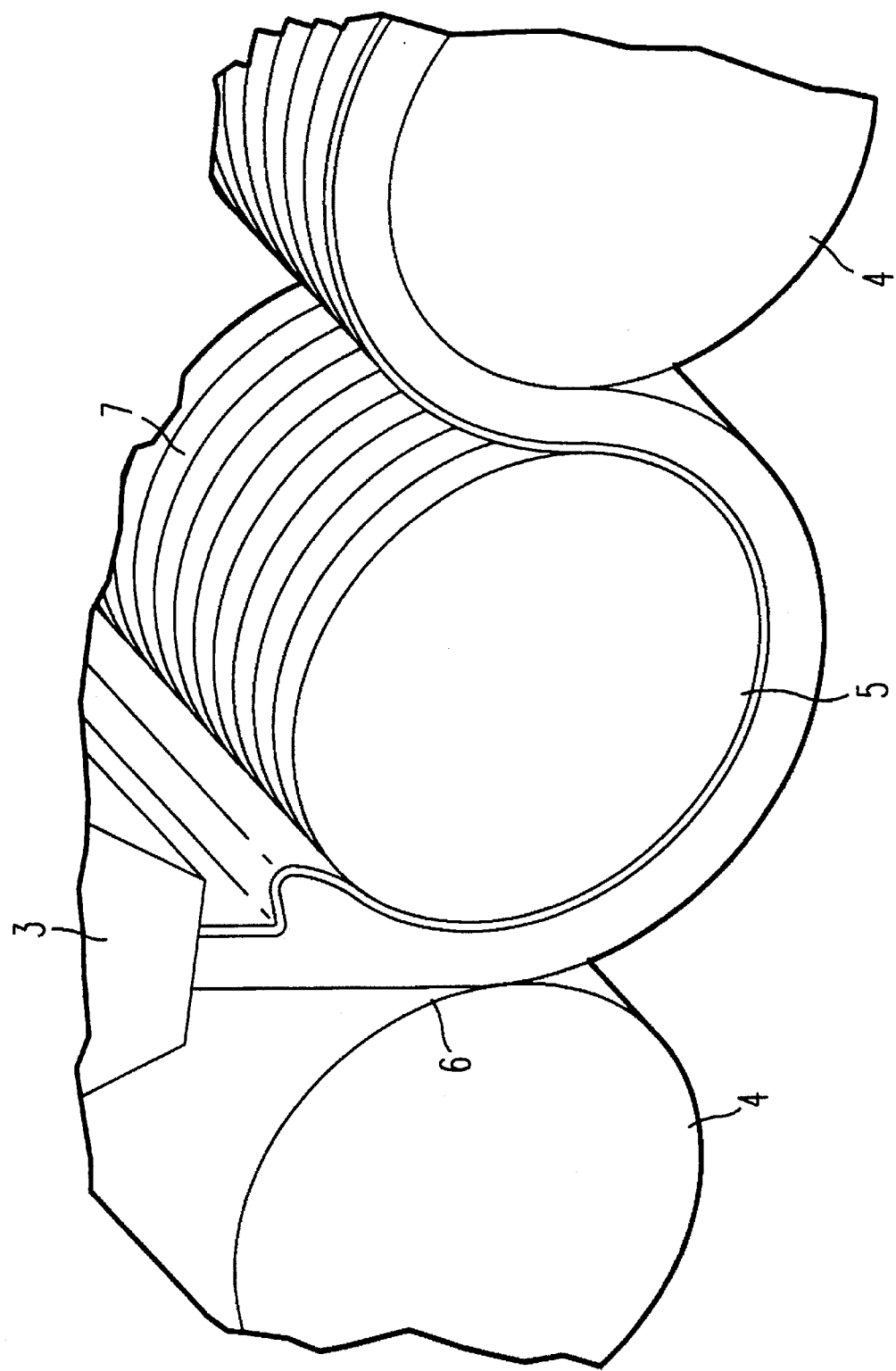
FIG. 2 shows in detail the three roll polishing stack.

FIGS. 1 and 2 illustrate the construction and operating mode of the extrusion system. The manufacture of multilayered plastic plates is known, e.g., from DE-A 32 44 953 and U.S. Pat. No. 4,477,521.

FIG. 1 is an overall view of the extrusion system, comprising main extruder (1), coextruder (2) and mold for coextrusion (3). Furthermore, the polishing stack is constructed from the rollers (4), (5), and (4') with the central roller (5) as the embossing roller. The surface (7) of the central roller (5) represents the negative to the plate surface (8). Between the rollers (4) and (5) is a nip (6). The extruded plates (10) with the structured surface (8) run over the supporting rollers (11).

FIG. 2 shows in detail the three roll polishing stack comprising the rollers (4) and (4') and the embossing roller (5) with the nip (6).

Of special interest is the technical production of linear Fresnel lenses according to the process of the invention. To date, Fresnel lenses have been made from suitable transparent plastics primarily by means of injection molding, by embossing or by means of machining.

All known applications using transparent plastics, i.e., so-called plastic glasses, for Fresnel lenses—acrylic glass (in essence polymethylmethacrylate=PMMA) could be cited—involve applications which impose high resolution requirements and correspondingly cause significant production problems. (Cf. Becker-Braun, Polymer Handbook, new edition, vol. I, Plastics, pp. 775–776, Carl Hanser 1990).

The preferred embodiment of the invention stems, among other things, from the knowledge that transparent plastic plates with linear Fresnel structure, in particular acrylic glass plates, can be used in an outstanding manner as light-collecting elements in solar collectors. Thus, there exists the additional problem of providing transparent plastic plates, preferably made of acrylic glass with linear Fresnel structure, produced according to a method that is as simple as possible.

Thus, a process for the manufacture of linear Fresnel lenses made of extrudable thermoplastics is provided in accordance with the invention, wherein the Fresnel lenses are produced in the extrusion process in the extrusion system, as described above (FIGS. 1 and 2). In so doing, the embossing roller exhibits a surface structure that corresponds to the lens surfaces to be cast.

By linear Fresnel structure is understood a surface structuring, where the Fresnel areas are arranged linearly and in parallel. (FIGS. 3a–3c and FIG. 4).

Figure 3A:
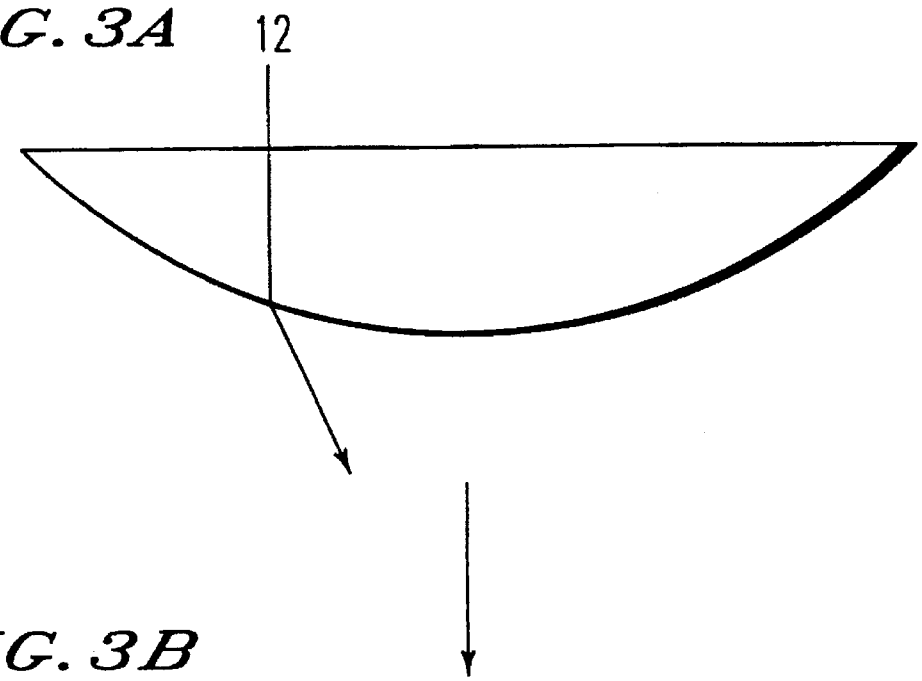
FIGS. 3a–3c show the Fresnel lens, starting as a normal lens, through subdivision of the lens into segments and parallel displacement of one surface of each segment, and indicates an incident light ray.
Figure 3B:
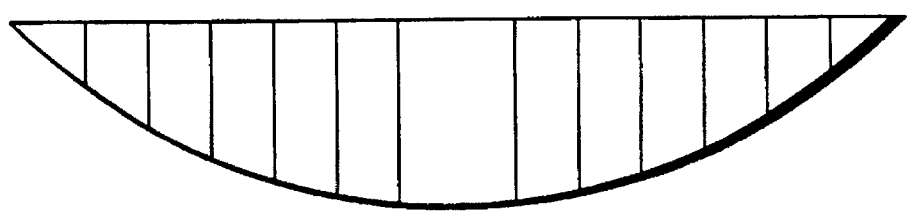
Figure 3C:
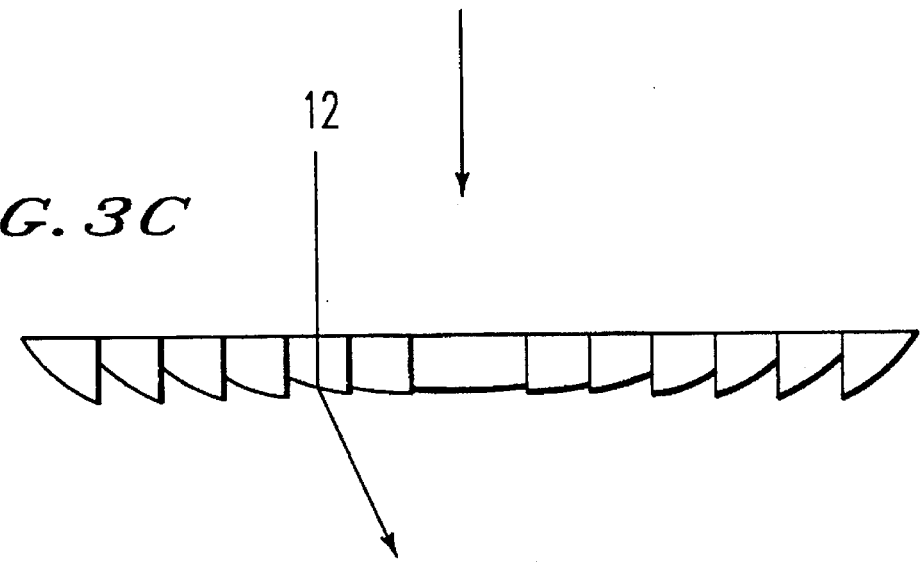

FIGS. 3a–3c show the Fresnel lens (12), which started as a normal lens (FIG. 3a), through subdivision of the lens into segments (FIG. 3b) and parallel displacement of one surface of each segment, and indicates an incident light ray.

Figure 4A:
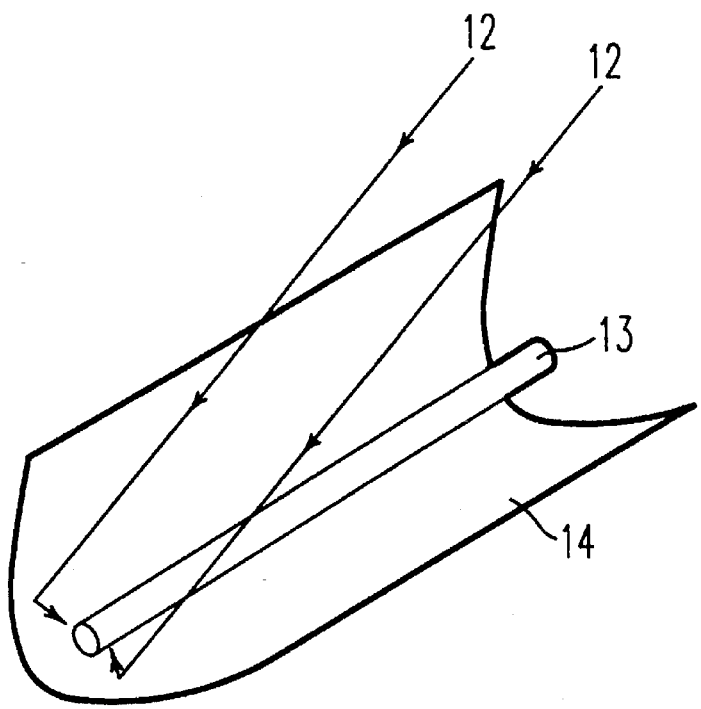
FIG. 4a shows a conventional solar collector system.

FIG. 4a shows a conventional solar collector system. Linear paraboloidal-type reflectors, made of vapor-deposited glass (14) in whose line of focus is fixed a pipe (13), through which a heat transfer liquid flows, serve as the light collector units.

Figure 4B:
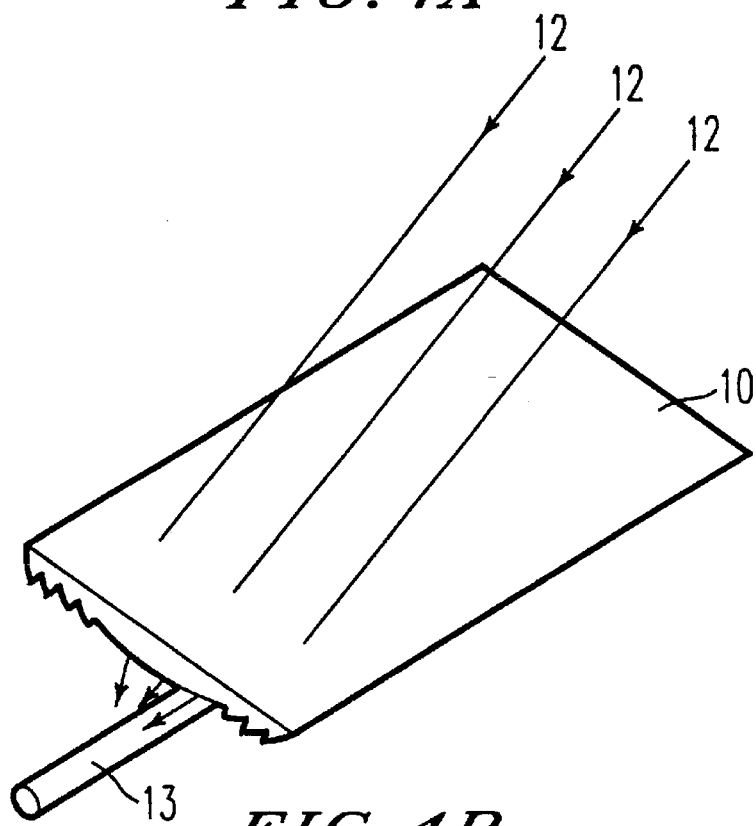
FIG. 4b shows a solar collector according to the invention.

FIG. 4b shows a solar collector according to the invention and including a pipe (13) guiding the heat transfer liquid and, as the light collecting optical element, a linear Fresnel lens (10) made of transparent plastic.

With respect to the construction of solar collectors, the present invention can be attached to existing solar collector systems (FIG. 4a). In so doing, linear paraboloidal-type reflectors, which are made of vapor-deposited glass (14) and in whose line of focus a pipe (13) is fixed through which a heat transfer liquid flows, serve as the light collector units. According to the invention, the solar collectors (FIG. 4b) contain at least one pipe (13), containing a heat transfer liquid, and as an optical element that collects the sunlight, shining in parallel rays, a linear Fresnel lens (10), both of which are arranged in such a manner that the light impinges in a focused manner through the Fresnel lens (10) on the pipe (13) containing the heat transfer liquid. The linear Fresnel lens (10) is made of transparent plastic, in particular acrylic glass. Expediently the pipe (13) is designed in such a manner that it is highly absorptive. This purpose is achieved, for example, by dyeing the material matt-black.

Figure 5:
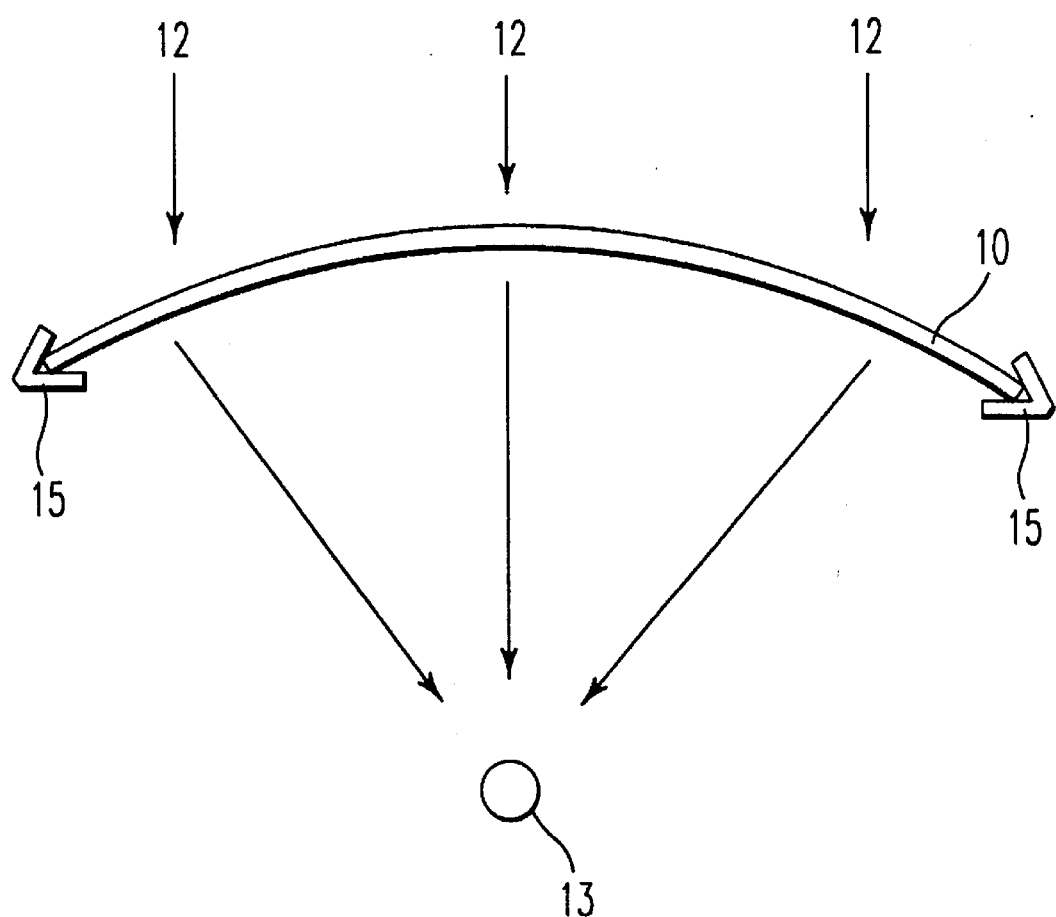
FIG. 5 illustrates a special embodiment of the invention.

The solar collector system functions in such a manner that the sunlight that shines in parallel rays strikes the planar surface of the linear Fresnel lens, which collects the light, and focuses on the pipe (13) fixed at a physically correct distance (readily determined by experiment), which contains the heat transfer liquid, and thus heats the heat transfer liquid. The heat is conducted or transferred in a well-known manner. FIGS. 4b and 5 are schematic drawings of the construction of the solar collectors produced according to the invention.

In a conventional embodiment, allowing modifications, the thickness of the produced plate (10) is about 6 mm. The step width of the Fresnel lens is 4 mm. At a focal distance of 1,000 mm, a 15 mm width of the line of focus is obtained (when the sunlight passes through the plate). The sunlight is concentrated by a factor of 26.7. At an irradiated power of 1,000 W/M$^2$, a power of 400 W/m can be irradiated on a pipe with a 15 mm diameter.

The known linear paraboloidal-type reflector (14), in whose line of focus is focused the light that shines in parallel through a pipe, can be replaced by the linear Fresnel lens (10) according to the invention as the light-collecting element. In a special embodiment the linear Fresnel lens (10) can also be fixed under mild prestress in the solar collector system (FIGS. 5), in order to counteract the effect of thermal expansion and thus to rule out undefined bulges. More particularly, FIG. 5 illustrates a special embodiment of the invention where the linear Fresnel lens (12) is clamped in the solar collector system under mild prestress and (15) denotes the clamping. In these cases the influence of the curvature must be taken into consideration when specifying the Fresnel structure.

The process according to the invention can be implemented as follows (FIG. 1). The extrusion system is constructed in essence from a main extruder (1), a coextruder (2) and a mold for the coextrusion (3). The maximum width of the extruded plates is determined by the coextrusion mold. In general, the extruded plates are 800 to 2,200 mm wide. Their thickness is also limited by the conditions of the coextrusion. Generally they are 0.5 to 25 mm thick, whereby the layer formed from the molding compound NF is defined primarily by the function intended with the structuring. However, in general its layer thickness ranges from 0.2 to 5 mm.

The basic molding compound BF raised to a suitable temperature by means of the main extruder (1) and the low viscosity molding compound NF raised to the suitable temperature in the coextruder (2) are merged in the coextrusion mold (3). As the reference, the die temperatures for the basic molding compound BF are the following:

| BASIC MOLDING COMPOUND BF | PROCESSING TEMPERATURE °C. |
| --- | --- |
| PMMA | 240 |
| hard PVC (pelletized) | 185 |
| HDPE | 170 |
| SB | 210 |
| PP | 235 |
| POM | 200 |
| PS | 175 |

The coextrudate CX issuing from the coextrudate mold (3) is conveyed over the three roll polishing stack comprising the rollers (4), (5), and (4'), whereby the center roller (5) is designed in such a manner as the embossing roller that its surface (7) represents the negative of the desired structured plate surface (8). Between the rollers (4) and (5) is the nip (6). Here the pressure maximum is supposed to be high in front of the narrowest point, in order to transfer as much embossing force as possible. The three roll polishing stack corresponds to the state of the art. The extruded plates (10) with the structured surface (8) are transported via supporting rollers (11). Subsequently they can be cut to the desired length. The profile (9) represents an exact reproduction in detail of the embossing roller surface (7).

The plastic plates manufactured according to the invention are characterized by a highly accurate reproduction of detail during the structuring operation and a very finely defined structuring. They are suitable for a plurality of tasks where the optical properties are of primary importance. Both concentric and linear Fresnel lenses, also semihologoams and the like, can be produced with excellent success.

Known engineering applications for Fresnel lenses become more readily available by means of the process of the invention, e.g., for projection screens, overhead projectors, filters for stage spot lights, wide angle view lenses for rear windows of motor vehicles such as delivery trucks or mobile homes, lenses for beacons, and the like.

Recently linear Fresnel lenses have found an especially interesting application as light collecting lenses in solar collectors. The advantage of the solar collectors according to the invention stems primarily from the application of the linear Fresnel lenses (3), for example acrylic glass. The advantages of such linear Fresnel lenses are, among others: the production possibility by means of the extrusion process and thus low price; low weight; and simple, optionally automatic cleaning.

Obviously, numerous modifications and variations of the present invention are possible in light of the above teachings. It is therefore to be understood that the invention may be practiced otherwise than as specifically described herein.

What is claimed is:

1. Process for the manufacture of plastic plates with a very finely structured surface by means of an extrusion system, comprising the steps of:

extruding a highly viscous basic molding compound BF;

substantially simultaneously extruding a low viscosity molding compound NF on said compound BF;

producing a coextrudate CX from the highly viscous basic molding compound BF and the low viscosity molding compound NF; and embossing a desired structure on a surface of said coextrudate, said surface being formed by said compound NF by introducing said coextrudate into a nip of a three roll polishing stack, whereby the surface or said plates is structured via the three roll polishing stack.

2. Process as claimed in claim 1, wherein the low viscosity molding compound NF contains parting agents TM.

3. Process as claimed in claim 1, wherein the temperature of an embossing roller is as high as 70° C. over the glass transition temperature of the low viscosity molding compound NF.

4. Process as claimed in claim 1 wherein the desired structure is a Fresnel lens.

5. Process as claimed in claim i wherein the desired structure is a linear Fresnel lens.

6. Process, as claimed in claim 1, wherein the basic molding compound BF is an acrylic resin.

7. The process of claim 1 wherein said steps of extruding a low viscosity molding compound and embossing a desired structure on a surface of said coextrudate are performed such that the coextrusion layer formed from the low viscosity molding compound does not exceed a maximum embossing depth of the embossing step.

* * * * *